United States Patent

[11] 3,553,428

| [72] | Inventor | John D. McGhee |
| | | Plymouth Meeting, Pa. |
| [21] | Appl. No. | 756,475 |
| [22] | Filed | Aug. 30, 1968 |
| [45] | Patented | Jan. 5, 1971 |
| [73] | Assignee | E. I. du Pont de Nemours and Company |
| | | Wilmington, Del. |
| | | a corporation of Delaware |

[54] APPARATUS AND METHOD FOR CONTROLLING THE POWER SUPPLIED TO A LOAD
19 Claims, 7 Drawing Figs.

[52] U.S. Cl............................................. 219/494
[51] Int. Cl........................................... H05b 1/02
[50] Field of Search......................... 219/494, 497, 501; 323/65

[56] References Cited
UNITED STATES PATENTS
| 2,944,137 | 7/1960 | Kaltenbach................ | 219/497 |
| 3,012,126 | 12/1961 | Ferguson..................... | 219/494 |
| 3,235,480 | 2/1966 | Swartz et al. ................ | 219/497 |

*Primary Examiner*—Bernard A. Gilheany
*Assistant Examiner*—F. E. Bell
*Attorney*—Herbert M. Wolfson ABSTRACT: A method for controlling the power supplied to a load and an apparatus to accomplish this, comprising: a means for monitoring the voltage supplied to the load; a voltage squaring circuit adapted to generate a control signal proportional to the average value of the square of the voltage; and a proportional controller adapted to compare the control signal with a reference signal and to proportionally control the power supplied to the load. The proportional controller comprises: a control amplifier, adapted to convert the DC control signal to an AC signal and to amplify the AC signal; a novel demodulating circuit; and a proportional band adjustment.

INVENTOR
JOHN D. McGHEE

BY Herbert M Wolfson
ATTORNEY

INVENTOR
JOHN D. McGHEE
BY [signature]
ATTORNEY

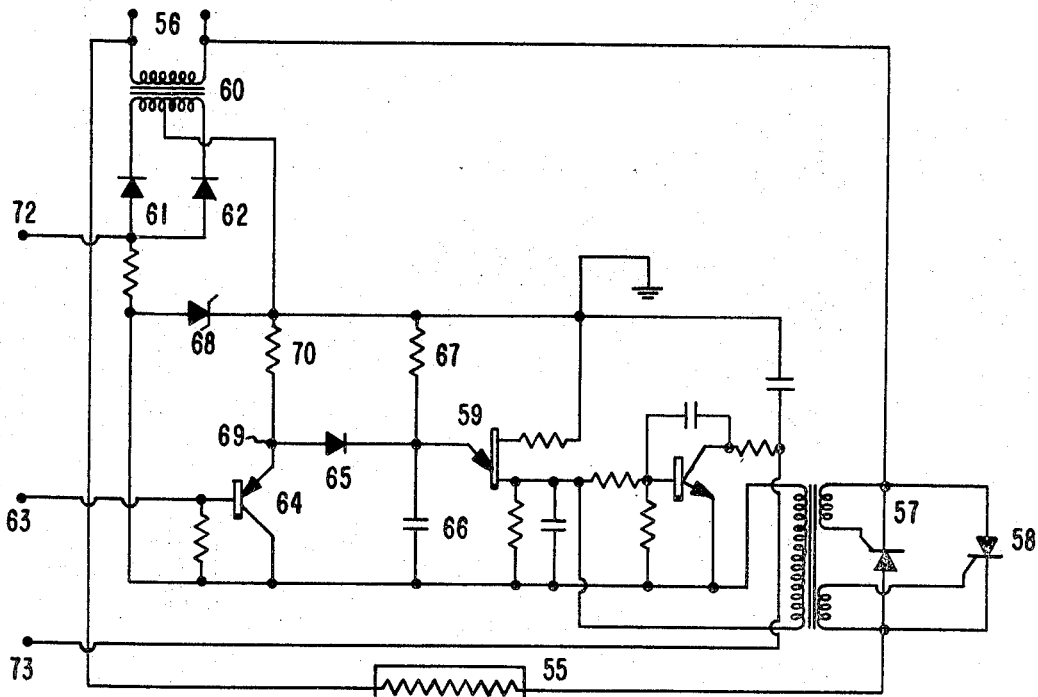
FIG. 4
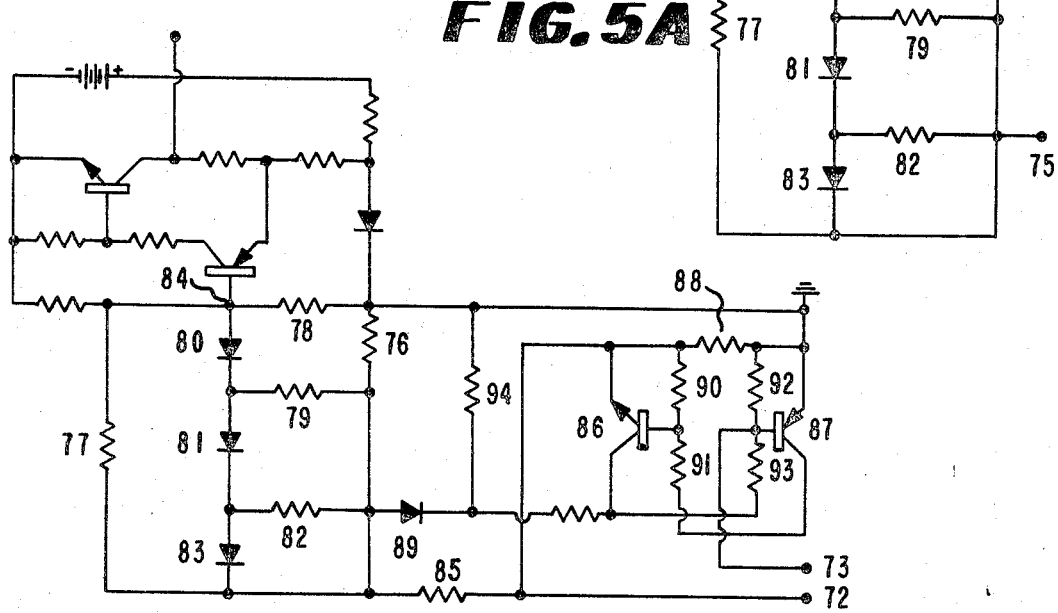
FIG. 5A
FIG. 5B
INVENTOR
JOHN D. McGHEE
BY Herbert M. Wolfson
ATTORNEY

APPARATUS AND METHOD FOR CONTROLLING THE POWER SUPPLIED TO A LOAD

CROSS REFERENCE TO RELATED APPLICATIONS

This invention is related to the subject matter of U.S. Pat. 3,283,560 issued 11/8/66 to J. C. Harden et al. (and assigned to the assignee of the present application), since the present invention can be used in the temperature control circuit discussed in that patent. This cross reference is intended merely to illustrate and not to restrict the scope and/or use of the present invention.

BACKGROUND

In many applications, it is necessary to accurately control the power supplied to a load. Such would be the case in a temperature control device which is designed to heat a sample to a specified temperature, possibly at a specified rate, or to maintain a sample at a specified temperature. In such applications, the power supplied to the load may be varied by design, but random fluctuations in power, such as that caused by variations in line voltage, cannot be tolerated. Some means must be incorporated into the device to compensate for such variation. It would also be desirable if this compensation could be made before the line fluctuations have a noticeable effect on the load.

One way in which this can be done is to use a regulated power supply, but this generally requires extensive and expensive external circuitry. Another way to accomplish the same result is to monitor the voltage supplied to the load and construct a feedback circuit which will compensate for fluctuations in this voltage. Such a feedback circuit is usually designed for proportional control rather than on-off control so that control upset will not occur. This is a perfectly acceptable way of handling the problem when voltage is the parameter of concern, but when it is some parameter related to the power supplied to the load that is of primary concern, there is a distinct advantage in monitoring the power, rather than the voltage. Thus, for example, if the temperature of a sample were being controlled, fluctuations in the voltage across the heating element for the sample would be immaterial, so long as the average power supplied to the heating element remains constant. Also, if proportional control of the power is desired, there is an advantage in using a feedback circuit which is linear to the power supplied to the load rather than one which is linear to the voltage applied across the load.

The present invention is an apparatus and method for proportional control of the power supplied to a load which incorporates a novel way of compensating for fluctuations in power due to variations in either wave shape or amplitude in line voltage. It comprises: monitoring the voltage supplied to the load; passing this voltage through a squaring circuit which generates a signal proportional to the square of the voltage and hence—with a constant load—to the power supplied to the load; generating a control signal which is proportional to the average value of this squared voltage; and feeding this control signal to a proportional controller which compares the control signal with a reference and maintains the power supplied to the load at the required level. The present invention is of general applicability, but it is particularly well suited for use in a temperature controller which incorporates elements such as a thermocouple and feedback circuitry. In such a controller the control signal from the squaring circuit can be passed through a proportional band adjustment, and added directly to the signal from the thermocouple before it enters the controller.

Also included in the present invention is a simple demodulating circuit, for use in the control amplifier, which is designed to provide a low distortion signal for accurate control of the power supplied to the load.

The operation and advantages of the present invention can be seen with reference to the following FIGS. wherein:

FIG. 4 is a schematic diagram of one possible SCR firing circuit which can be used in the present invention; and FIGS. 5A and 5B are schematic diagrams of possible voltage squaring circuits which can be used in the present invention.

DISCUSSION OF THE DRAWINGS

Figure 1:
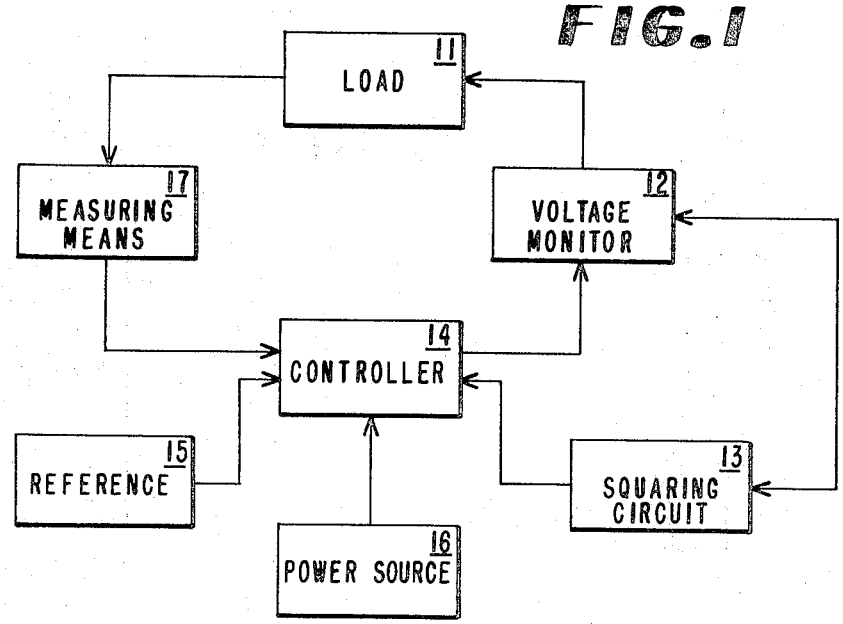
FIG. 1 is a block diagram of one possible circuit in which the present invention is used to maintain the power supplied to a load at a constant level.

FIG. 1 is one embodiment of the present invention in which the power supplied to a resistive load 11 is maintained at a reference level. The circuit incorporates a voltage monitoring device 12 which can be any device adapted to generate a signal proportional to the instantaneous voltage applied across the load. This signal is fed through a shaping circuit 13 which is adapted to generate a signal proportional to the square of the instantaneous voltage applied to the load. The squared signal is then fed to a controller 14 which takes the average value of the squared signal—now proportional to the average value of the power supplied to the load—compares it with the signal from a reference 15, and proportionally controls the power supplied to the load by power source 16. The circuit may also contain a measuring means 17—adapted to measure a property of the load, such as temperature, speed, or any other property of interest—which can be a thermocouple, a tachometer, or any instrument designed to measure the property of interest. In this case, the controller is ultimately adapted to maintain the property of interest at the reference level, so the signal from this measuring means is also fed to the controller to be compared with the reference signal. Generally, in such devices the power source is an AC power source, and the power supplied to the load is controlled by varying the portion of the AC cycle during which the voltage is supplied to the load, rather than by controlling the magnitude of the average voltage. In this case, the reference 15 can be adapted to generate a constant signal so that the power supplied to the load can be maintained at a constant level. Alternatively, it can be adapted to generate a variable signal so that the power supplied to the load can be varied at will.

Figure 2:
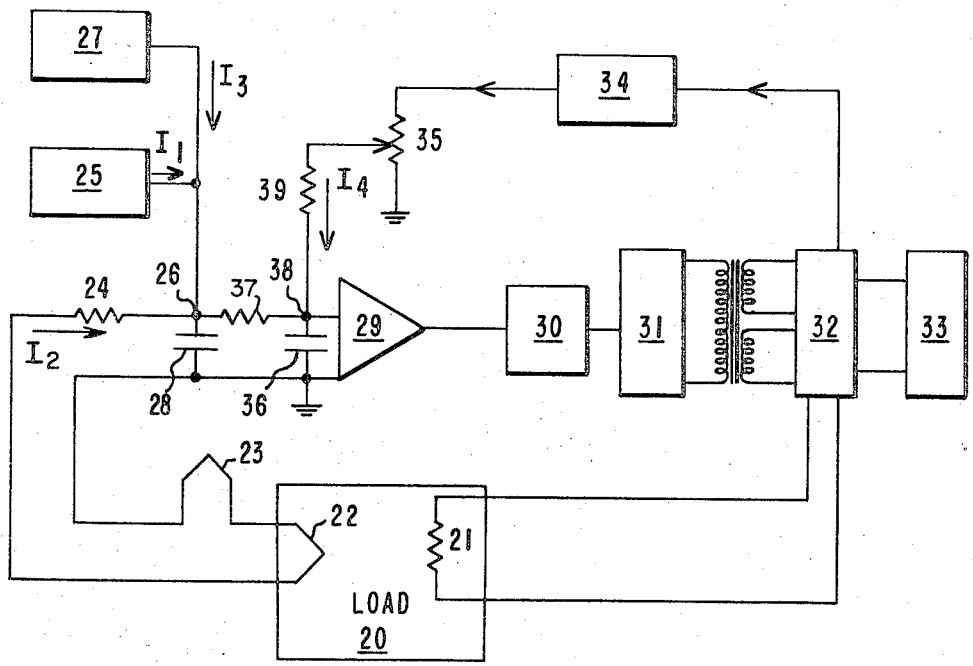
FIG. 2 is a schematic diagram of one possible temperature control circuit in which the present invention has been incorporated.

FIG. 2 is a schematic diagram of a temperature controller in which the present invention has been incorporated. In this FIG., the sample 20 is heated by a resistance heater 21. The temperature of the sample is monitored by a thermocouple, with a sample junction 22 and a reference junction 23, which generates a voltage proportional to the difference in temperature between the sample junction and the reference junction. This voltage signal is then converted to a current $I_2$ by passing it through resistor 24. The circuit can optionally incorporate a starting temperature circuit 25 which will generate a current $I_1$ equal to a selectable temperature difference between the sample junction and the reference junction in the thermocouple. The current from the starting temperature circuit is fed to summing point 26 in such manner that the sum of the currents at the summing point will be substantially zero when the sample reaches a temperature sufficient to generate a current in the thermocouple circuit equal to the current generated by the starting temperature circuit. The circuit can also incorporate a rate of heating circuit 27, which will generate a steadily varying current, and feed this current to the summing point 26.

The signals fed to summing point 26 are suitably filtered by capacitor 28 and fed to a control amplifier 29, which in this instance is a chopper and an AC amplifier. From the control amplifier the signal is fed to a demodulator 30. From the demodulator the signal is fed to a SCR firing circuit 31 which is adapted to trigger a SCR switch 32 inserted in the power line between the power source 33 and the load 21. In this way, when there is a signal at summing point 26, the SCR firing circuit will trigger the SCR switch to allow power to be fed to the load. The magnitude of the signal at 26 determines the portion of the AC cycle during which power will be supplied to the load, and the length of time that power is being supplied to the load will determine whether the sample is being heated, maintained at a constant temperature, or allowed to cool; and the rate at which the various changes occur.

The portions of the circuit illustrated in FIG. 2, which have been discussed above, are conventional and well known to those skilled in the art. The critical feature of the present invention is found in the feedback circuit between the SCR switch 32 and the summing point 26. This feedback circuit contains a squaring circuit 34, adapted to generate a signal proportional to the square of the instantaneous voltage applied to the load. The squared signal is then passed through a proportional band adjustment comprising resistors 35 and 39 to summing point 38, so that a signal proportional to the average power supplied to the load can be subtracted from the signal coming from summing point 26 through resistor 37 to summing point 38. It is the balancing of the current through resistor 37 with the feedback current through resistor 39 that provides proportional control.

In this particular embodiment, the signal at summing point 38 is the sum of four currents: $I_1$, a current equal to the desired starting temperature; $I_2$, a current proportional to the sample temperature $I_3$, a current which is varied, at a rate equivalent to the desired rate of temperature change in the sample, in a magnitude proportional to the desired temperature change in the sample; and $I_4$, a current proportional to the average power supplied to the heater. Currents $I_1$, $I_2$ and $I_3$ are summed at summing point 26, and that sum is summed with $I_4$ at summing point 38. Initially, the starting current $I_1$ is set at a value equivalent to the desired starting temperature and point 26 assumes a potential due to that current. The SCR circuits fire throughout the full cycle, and the sample is heated. As the temperature of the load rises, $I_2$ increases to the point when it approaches $I_1$. The potential at summing point 26 approaches zero, reducing the power to the load to the point where the temperature of the load remains constant.

Concurrent with this, as soon as the load receives power, a current $I_4$ proportional to the power supplied to the heater is added to the sum of $I_1$ and $I_2$. Initially, this additional signal decreases the potential at summing point 38 below what it would normally be, calling for less power. As the two signals $I_1$ and $I_2$ approach one another, however, the power required by the heater to bring the sample to the proper temperature decreases, and, hence, $I_4$ decreases. If the sample reached and remained at the equilibrium temperature, $I_4$ would be constant. However, there are fluctuations in line voltage which vary the temperature of the sample. This variation in temperature will be detected by the thermocouple, but only slowly, so that control upsets can occur. The power monitoring feedback circuit, however, detects such variations immediately and adjusts the value of $I_4$ to the level required to compensate for them before these power fluctuations manifest themselves in temperature changes in the sample.

Later, if the sample is to be heated or allowed to cool from its initial equilibrium temperature to another temperature, a varying current $I_3$ can be added at the proper rate and magnitude to accomplish the desired change. The power feedback circuit serves the same function in this temperature change as it did in maintaining the initial equilibrium temperature.

The signals summed at summing point 38 are DC signals. These signals must be amplified before they are fed to the SCR firing circuit. One convenient way to amplify a DC signal is to convert it to an AC signal by using a chopper, amplifying the AC signal, and then converting the AC signal to a DC signal by demodulation. This procedure is conventional, but the components for such a system vary with the needs of the particular system. The present invention incorporates a novel demodulating circuit for use in the amplification portion of the circuit. This circuit is inexpensive, because of the few components required, but in addition it has the advantage of being free from switching distortions caused by the chopper in generating the AC signals so that it provides an ideal signal to feed the SCR firing circuit.

Figure 3A:
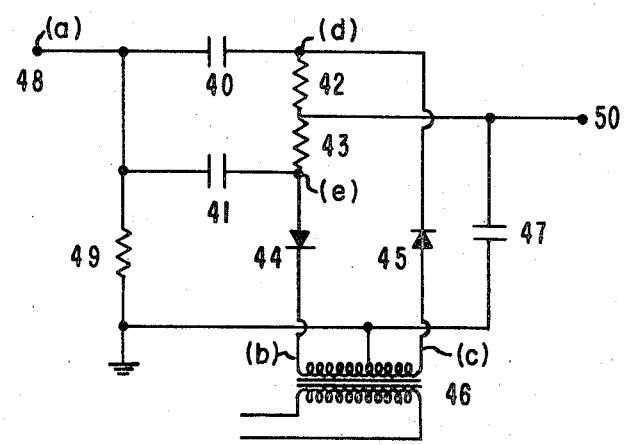
FIG. 3A is a schematic diagram of a demodulating circuit which can be used in the present invention.
Figure 3B:
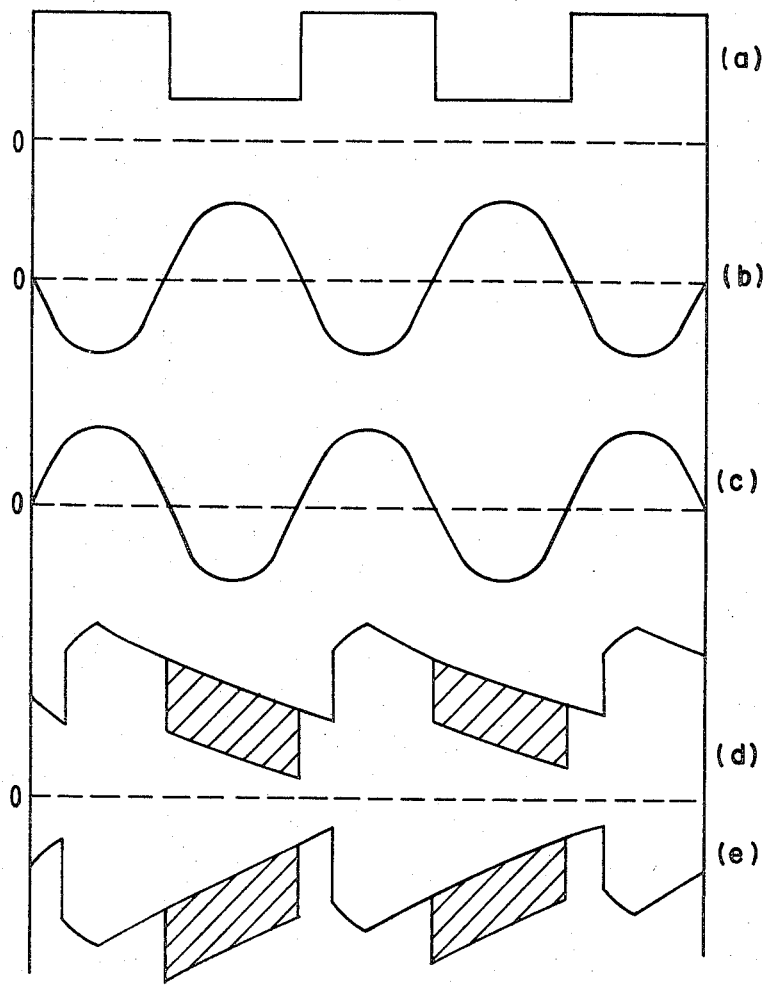
FIG. 3B is a plot of the voltage curves at various points in the demodulator.

The chopper generates a square wave whose amplitude is proportional to the amplitude of the input signal. This square wave is then amplified. Both the chopper and amplifier are contained in the control amplifier 29. The particular embodiment of the demodulator used is shown in FIG. 3A. It is a simple circuit, comprising a pair of capacitors 40 and 41, a pair of resistors 42 and 43, a pair of diodes 44 and 45, a transformer 46 with a grounded center tap, and a filter capacitor 47. The square wave from the control amplifier is fed into input 48 which is referenced to ground, for AC purposes, by some means such as resistor 49. The input signal is illustrated by curve (a) in FIG. 3B. The signals from the transformer is in phase with the input signal, so that the potentials at points (b) and (c) in FIG. 3A are given respectively by curves (b) and (c) in FIG. 3B. Diodes 44 and 45 will not conduct until the signals from the respective ends of the transformer reach their conductance level, at which point they will begin to conduct, raising the potential sharply at points (d) and (e) of FIG. 3A. This is shown in curves (d) and (e) of FIG. 3B. After the initial sharp rise in potential, the capacitors will be charged to the potential of the transformer. Instead of decaying with the signal from the transformer, however, the charge on capacitors 40 and 41 will decay slowly through resistors 42 and 43. The output of the circuit 50, between resistors 42 and 43 is the sum of the average potential at points (d) and (e) in FIG. 3A. When there is no AC input to junction 48, this sum is equal to zero, as can be seen by summing curves (d) and (e) in FIG. 3B—without the cross hatched sections.

All of this occurs in the absence of an input signal to junction 48. A square wave input, applied to point (a) in FIG. 3A, adds a set potential to both of points (d) and (e). These potentials do not cancel one another at the output, but add, so that at the output of the circuit is equivalent to the sum of the instantaneous values of the shaded portions of curves (d) and (e) of FIG. 3B. Without the filter then, the output of the circuit would be a periodic square wave signal with a peak to peak magnitude proportional to the input signal. Passing this signal through a filter, represented by capacitor 47, yields a DC signal equal to the average value of the input signal. This DC signal is then fed to the SCR firing circuit.

FIG. 4 is a schematic diagram of a typical SCR firing circuit used to power a load. The current supplied to the load 55 by the power line 56 must pass through a switch comprising two silicon controlled rectifiers (SCR) 51 and 58. In operation, neither of the SCR's conduct initially, and there is no current through the heater. To conduct, the SCR transistors must be triggered by a pulse from a unijunction relaxation oscillator 59. The remainder of the circuit in FIG. 4 comprises the SCR triggering circuit. The line voltage is monitored by a transformer 60, and rectified by diodes 61 and 62. Zener diode 68 restricts the voltage applied across the capacitor and other circuitry for protective purposes. In operation, junction 63 is biased negative so that transistor 65 does not conduct. If there is no input to junction 63 to offset this bias, then as the instantaneous value of the rectified line voltage changes, capacitor 66 will charge up only through resistor 67. When the charge on capacitor reaches sufficient magnitude the unijunction 59 fires, triggering one of the SCR's so that a current passes through heater 55. The SCR conducts for the remainder of the cycle and then automatically shuts off. The length of time during which current passes through the heater depends on the length of time required to charge up capacitor 66. The time constant of resistance 67 and capacitor 66 is chosen so that it will take a period equal to the entire line cycle to charge capacitor 66 to the point where the unijunction will fire. Theoretically, then, if the only signal applied to the circuit is line voltage, the circuit will not conduct, but in practice, the unijunction always fires at the very end of the cycle, causing conduction to take place for a short time, thus providing synchronization of the firing circuit with the signal from the line. This aberration can and will be neglected in this portion of the discussion.

If, however, a positive signal is applied to input 63, partially or entirely offsetting the negative bias, diode 65 will begin to conduct, and because of this capacitor 66 can be made to charge more rapidly This is due to the fact that when transistor 64 is conducting, the potential at point 69 follows the potential at point 63, so that a potential develops across resistor 70. Capacitor 66 can now charge up through resistor 70 and diode 65 as well as resistor 67 The higher the potential at junction 63, the larger the potential drop from the lower end of resistor 70 to ground, and the faster capacitor 66 will charge up. In operation, a large signal applied to the junction 63 will charge capacitor 66 virtually instantaneously so that the unijunction will fire as soon as the line cycle begins. In this case the SCR will conduct through the whole cycle and maximum power will be applied to the load. If a smaller signal is applied to junction 63, capacitor 66 will charge up to a certain value, below that required to fire the unijunction, instantaneously, and then slowly acquire the remaining charge through resistor 67. In this way, depending on the potential applied to junction 63, the load can be supplied with current during any portion or all of the AC cycle of line voltage.

The remainder of the components shown in FIG. 4 are for the purpose of converting the spike generated by the unijunction into a signal that is appropriate to fire the SCR transistors. Their operation is well known to those skilled in the art and, hence will not be discussed.

The operation of the components discussed above is well known to those skilled in the art. The distinctive feature of the present circuit is that the voltage supplied to the load is monitored. The rectified signal applied to the unijunction is monitored at junction 72, and the spike supplied by the unijunction to trigger the SCR transistors is monitored at junction 73. These two signals will be used to feed the squaring circuit so that a signal proportional to the power supplied to the load can be generated by that circuit.

The major components of the squaring circuit are shown in FIG. 5A. This is a familiar shaping circuit, composed of diodes and resistors, which can be used to approximate many algebraic functions. In this case, however, since the problem is to convert voltage to power, a squaring circuit is appropriate. Initially, none of the diodes in FIG. 5A are conducting and the potential applied between junction 75 and ground, across resistor 76, is equal to the sum of the potential drop across resistors 77 and 78. The output at junction 84, is the potential across resistor 78. As the input voltage increases, the potential drop across resistor 77 increases until the potential drop across resistor 77 is large enough to make diode 80 conduct. At this point the potential drop between junction 75 and ground is equal to the potential drop across resistor 78 and the potential drop across a resistance equal to $\frac{R_{77}R_{79}}{R_{77}+R_{79}}$, which is less than $R_{77}$. This means that more of the potential drop between junction 75 and ground appears across resistor 78. The initial response curve was a straight line with a slope equal to $R_{77}$. The response after diode 80 cuts-in is another straight line with a steeper slope.

As the input increases, the potential across resistor 79 increases to the point where diode 81 conducts, and resistance 82 is added in, again changing the slope of the response curve. Finally, when the potential across resistance 82 increases to the conductance point, diode 83 cuts-in and the output voltage across resistor 78 becomes equal to the input voltage across resistance 76. In this way, the response curve can be shaped by adding a series of straight lines to approximate a square response curve. As many cut-in circuits as required can be used, but four, as shown in FIG. 5A are sufficient to approximate a square curve adequately for the present purpose.

FIG. 5B illustrates how the squaring circuit of FIG. 5A can be used to generate a signal proportional to the actual power delivered to the load. There are two inputs to the circuit of FIG. 5B. The signal into junction 72, which is connected to junction 72 in FIG. 4, is the instantaneous value of rectified line voltage which would be applied to the load if the SCR switch were always closed. The signal into junction 73, which is connected to junction 73 in FIG. 4, is the pulse from unijunction in the SCR firing circuit, which indicates for what portion of the AC cycle power is being supplied to the load. The signal into 72 is the input voltage to the squaring circuit. The squaring circuit is indicated by the same elements as shown in FIG. 5A. A small portion of the input signal is applied directly to the squaring circuit through the large resistor 85 This is to compensate for the fact that the SCR switch always fires at the end of the AC cycle, so there is always some power, albeit very little, being applied to the load. The major portion of the signal is fed through a switch comprising two transistors 86 and 87. Transistor 86 is normally nonconducting so that the signal is fed directly to ground through resistor 88. When the pulse from the unijunction appears at junction 73, however, this causes transistor 87 to fire, which in turn triggers transistor 86. The input signal, then, instead of being fed directly to ground, is fed through a resistance divider composed of resistances 94 and 95 to diode 89 and the squaring circuit. In this way the squaring circuit generates a signal proportional to the square of the instantaneous line voltage only during that portion of the AC cycle during which power is actually being applied to the load. The switching circuit containing transistors 86 and 87 is much like a SCR firing circuit in that after it has been turned on, it conducts until the end of the AC cycle, at which point it ceases to conduct and will not conduct again until a new pulse from the unijunction is fed to transistor 87. This is accomplished by resistors 90 and 91, and resistors 92 and 93 which raise the base voltage applied to transistor 86 and 87 above ground so long as there is a non zero signal at junction 72. When the line voltage drops to zero, as it does periodically, the base of both transistors will drop to ground potential and they will shut off.

The signal out of the squaring circuit at 84 is then fed through a linear amplifier circuit such as the one shown in FIG. 5B. This is a conventional amplifier circuit which will not be described since any suitable circuit can be used. It is included merely to indicate that normally some amplification is required before the output signal from the squaring circuit is passed through the proportional band adjustment resistors 35 and 39 to the summing point 38, of FIG. 2, where the instantaneous power signal is converted to the average power signal by the filtering action of capacitor 36.

I claim:

1. A control circuit comprising:
 a load;
 a power source for said load;
 control means connected between said load and said power source, said control means being adapted to control the power supplied to said load and said control means comprising reference means adapted to generate a reference signal;
 monitoring means connected between said control means and said load, said monitoring means being adapted to generate a signal proportional to the instantaneous voltage supplied to said load; and
 a feedback circuit comprising a voltage squaring circuit connected between said monitoring means and said control means, said voltage squaring circuit being adapted to generate a signal proportional to the average value of the square of the signal generated by said monitoring means and to feed that signal to said control means, said control means being further adapted to compare the signal from said squaring circuit with said reference signal and to proportionally control the power supplied to said load in response to the difference between the reference signal and the signal from said squaring circuit.

2. The control circuit of claim 1 wherein said load is a resistive load.

3. The control circuit of claim 1 wherein said load is a resistive load, said power source is an AC power source, and said control means is adapted to control the power supplied to said load by controlling the portion of the AC cycle during which voltage is supplied to said load.

4. The controller of claim 1 wherein said voltage squaring circuit comprising: an input junction; an output junction; a resistance; and a plurality of voltage sensitive conductance elements adapted to begin conducting when the voltage across said conductance elements exceeds the conductance threshold of said conductance elements; said resistance and said conductance elements being disposed relative to one another and relative to said input junction and said output junction in such manner that the resistance between said input junction and said output junction changes in substantially discrete steps as the voltage applied to said input junction increases.

5. The voltage squaring circuit of claim 4 wherein said voltage sensitive conductance elements comprise a resistor and a diode connected in series and wherein the conductance threshold is the conductance threshold of said diode.

6. The voltage squaring circuit of claim 4 wherein: said resistance is connected directly between said input junction and said output junction; the first of said conductance elements is connected in parallel with said resistance; and each subsequent conductance element is connected in parallel with the resistor of the proceeding conductance element.

7. A method of compensating for variations in line voltage applied to a resistive load which comprises: monitoring the voltage supplied to said load; generating a signal proportional to the square of said voltage; generating a control signal proportional to the average value of said signal; and feeding said control signal to a controller adapted to compare said control signal with a reference signal and to vary the power supplied to said load.

8. A method of controlling the temperature of a sample which comprises: heating said sample with a resistance heater adapted to be supplied with line voltage; monitoring the voltage supplied to said load; generating a signal proportional to the square of said voltage; generating a control signal proportional to the average value of said signal; monitoring the temperature of said sample; generating a signal proportional to the temperature of said sample; and feeding said temperature signal and said control signal to a proportional controller adapted to compare said temperature and said control signals with a reference and to vary the power supplied to said load.

9. A control circuit comprising:
a load;
a power source for said load;
control means connected between said load said power source, said control means being adapted to control the power supplied to said load and said control means comprising reference means adapted to generate a reference signal;
voltage monitoring means connected between said control means and said load, said voltage monitoring means being adapted to generate a signal proportional to the instantaneous value of the voltage applied to said load;
measuring means connected between said control means and said load, said measuring means being adapted to measure the property that said control circuit is adapted to control, to generate a measuring signal proportional to that property and to feed that measuring signal to said control means; and
a voltage squaring circuit connected between said monitoring means and said control means, said voltage squaring circuit being adapted to generate a signal proportional to the average value of the square of the signal generated by said monitoring means, and to feed this signal to said control means, said control means being further adapted to add the measuring signal to the signal from said squaring circuit, to compare the resultant signal with the reference signal and to proportionally control the power supplied to said load in response to the difference between the resultant signal and said reference signal.

10. The control circuit of claim 9 wherein said load is a resistive load.

11. The control circuit of claim 9 wherein said load is a resistive load, said power source is an AC power source, and said control means is adapted to control the power supplied to said load by controlling the portion of the AC cycle during which voltage is applied to said load.

12. A temperature controller comprising:
a load adapted to provide heat to a sample;
a power source for said load;
control means connected between said load and said power source, said control means being adapted to control the power supplied to said load and said control means comprising reference means adapted to generate a reference signal;
voltage monitoring means connected between said control means and said load, said voltage monitoring means being adapted to generate a signal proportional to the instantaneous value of the voltage applied to said load;
temperature monitoring means connected between said control means and said load, said temperature monitoring means being adapted to generate a temperature signal proportional to the temperature monitored, and to feed that temperature signal to said control means; and
voltage squaring circuit connected between said monitoring means and said control means, said voltage squaring circuit being adapted to generate a signal proportional to the average value of the square of the signal generated by said monitoring means, and to feed this signal to said control means, said control means being further adapted to add the temperature signal to the signal from said squaring circuit, to compare the resultant signal with said reference signal and to proportionally control the power supplied to said load in response to the difference between the resultant signal and said reference signal.

13. The control circuit of claim 12 wherein said load is a resistive load.

14. The control circuit of claim 12 wherein said load is a resistive load, said power source is an AC power source, and said control means is adapted to control the power supplied to said load by controlling the portion of the AC cycle during which voltage is applied to said load.

15. The control circuit of claim 12 wherein said temperature monitoring means is adapted to monitor the temperature of the load.

16. The control circuit of claim 12 wherein said temperature monitoring means is adapted to monitor the temperature of the sample.

17. The controller of claim 12 wherein said voltage squaring circuit comprising: an input junction; an output junction; a resistance; and a plurality of voltage sensitive conductance elements adapted to begin conducting when the voltage across said conductance elements exceeds the conductance threshold of said conductance elements; said resistance and said conductance elements being disposed relative to one another and relative to said input junction and said output junction in such manner that the resistance between said input junction and said output junction changes in substantially discrete steps as the voltage applied to said input junction increases.

18. The voltage squaring circuit of claim 17 wherein said voltage sensitive conductance elements comprise a resistor and a diode connected in series and wherein the conductance threshold is the conductance threshold of said diode.

19. The voltage squaring circuit of claim 17 wherein: said resistance is connected directly between said input junction and said output junction; the first of said conductance elements is connected in parallel with said resistance; and each subsequent conductance element is connected in parallel with the resistor of the preceding conductance element.

PO-1050
(5/69)

UNITED STATES PATENT OFFICE
CERTIFICATE OF CORRECTION

Patent No. 3,553,428          Dated January 5, 1971

Inventor(s)      John D. McGhee

It is certified that error appears in the above-identified patent and that said Letters Patent are hereby corrected as shown below:

Column 7, line 46, after "load" insert --and--.

Column 8, line 24, after "means" delete "and".

Signed and sealed this 18th day of May 1971.

(SEAL)
Attest:

EDWARD M. FLETCHER, JR.
Attesting Officer

WILLIAM E. SCHUYLER,
Commissioner of Patent